Jan. 14, 1964  B. WEBB, JR  3,118,089
PHASE-SENSITIVE DEVICE
Filed Dec. 7, 1960

WITNESSES
Leon J. Taza
Leon M. Garman

INVENTOR
Bryan Webb, Jr.
BY C. L. Freedman
ATTORNEY

United States Patent Office 3,118,089
Patented Jan. 14, 1964

3,118,089
PHASE-SENSITIVE DEVICE
Bryan Webb, Jr., Wilmette, Ill., assignor to Westinghouse Electric Corporation, East Pittsburgh, Pa., a corporation of Pennsylvania
Filed Dec. 7, 1960, Ser. No. 74,396
5 Claims. (Cl. 317—137)

This invention relates to phase-sensitive devices and has particular relation to phase-sensitive devices for discriminating between two conditions of an alternating quantity which are displaced in phase from each other by 180 degrees.

In accordance with the invention an operating voltage in the form of a first alternating quantity is applied to directionally-responsive translating means through a gate. The gate is controlled by a second alternating quantity which is to be compared in phase to the first alternating quantity. The gate is open for transmitting the first alternating quantity only for half cycles of a second alternating quantity which are of a predetermined single polarity.

Preferably the magnitude of the output of the phase-sensitive device is substantially independent of the discriminating or detecting function of the device. Preferably the alternating quantity having the more constant magnitude is selected as the first alternating quantity.

It is therefore an object of the invention to provide an improved phase-sensitive device wherein the output magnitude is substantially independent of the sensitivity of the device.

It is a further object of the invention to provide a phase-sensitive device responsive to the phase relationship of first and second alternating quantities wherein a gate controlled by pulses of one polarity derived from the first alternating quantity determines the application of the second alternating quantity to directionally-responsive translating means.

It is also an object of the invention to provide a phase-sensitive device as defined in the preceding paragraph wherein the gate is a bridge rectifier.

Figure 1:
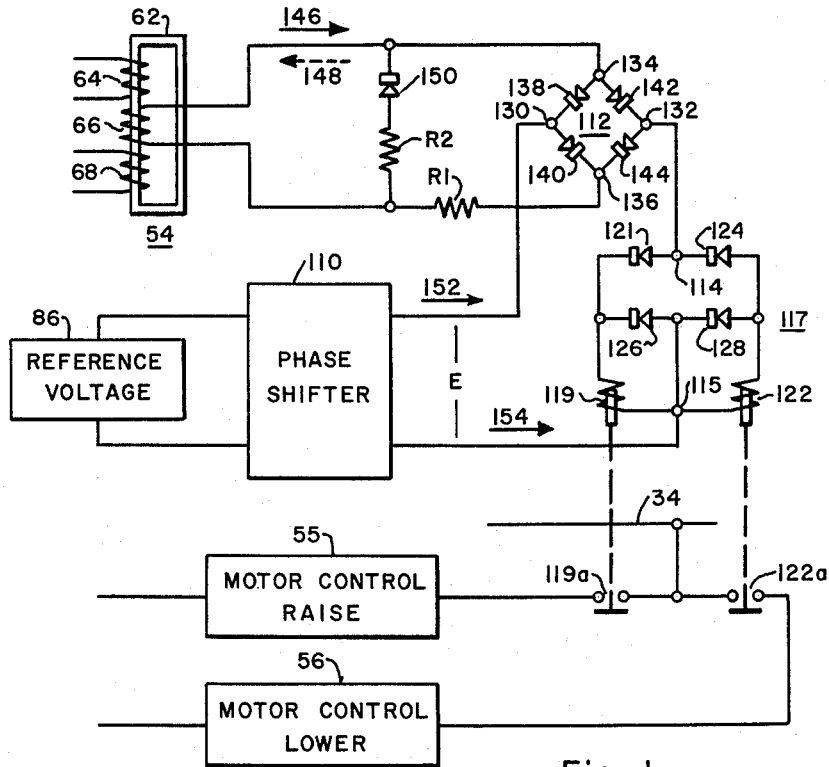
Figure 2:
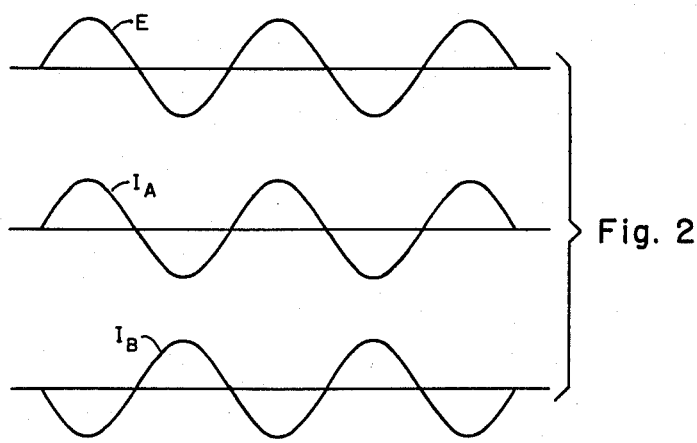

Other objects of the invention will be apparent from the following description taken in conjunction with the accompanying drawing, in which:

FIGURE 1 is a schematic view of a phase-sensitive device embodying the invention with parts broken away; and FIG. 2 is a graphical representation of wave forms encountered in the device of FIG. 1.

The phase-sensitive device of the present invention may be employed for various applications wherein the phase relationship of two alternating quantities is to be determined or to be responded to. In order to simplify the presentation of the invention it will be assumed that the phase-sensitive device is employed in place of the directional relay shown in the Smith and Wells Patent 2,913,-591 which issued November 17, 1959 for the purpose of controlling the relationship between master and slave tap-changing transformers.

Certain components of the aforesaid Smith and Wells patent are reproduced in FIG. 1. Thus FIG. 1 shows a portion of the electrical conductor 34, the magnetic means 54, the motor control raise means 55, the motor control lower means 56 and the substantially constant source 86 of alternating current voltage which are identified in the aforesaid patent by the same reference characters. Reference may be made to such patent for a more complete discussion of these components.

As indicated in the Smith and Wells patent, the magnetic means 54 comprises a magnetic core member 62 which has disposed in inductive relationship therewith windings 64, 66 and 68. The winding 64 is energized in accordance with the output of the master tap changer transformer. The winding 68 is energized in accordance with the output of the slave tap changer transformer. The winding 66 has an output dependent on the difference in outputs of the master and slave tap changer transformers. Thus if the two transformers are operating correctly to produce equal voltage outputs the winding 66 has a zero output. If the master tap changer transformer has an output voltage greater than that of the slave tap changer transformer a current similar to the current $I_A$ in FIG. 2 may be supplied by the winding. The current $I_A$ represents a current having a power frequency such as 60 cycles per second and is plotted with magnitudes represented by ordinates and with time represented by abscissas in a conventional manner.

Should the slave tap changer transformer have voltage outputs greater than that of the master tap changer transformer, the winding 66 would supply a current represented by the current $I_B$ in FIG. 2 which is displaced in phase by 180° from the current $I_A$.

A voltage is derived from the source 86 which preferably has a relatively constant magnitude, is of the same frequency as the currents $I_A$ and $I_B$ and does not change in phase relative to these currents. Conveniently it may be derived from the voltage supplying the tap changer transformers.

The voltage supplied by the source 86 is shifted in phase if necessary by a phase shifter 110 to produce a voltage E as shown in FIG. 2. It will be noted that the voltage E is in phase with the current $I_A$ and is displaced by 180° in phase from the current $I_B$.

The voltage E is applied through a gate 112 across the input terminals 114 and 115 of directionally-responsive translating means 117. Such translating means has one response for a voltage of one polarity applied across the terminals 114 and 115 and a second response for a voltage of the opposite polarity applied across these terminals.

In the specific embodiment illustrated in FIG. 1, an electromagnetic or solenoid type relay 119 has its operating winding connected through a rectifier 121 across the terminals 114 and 115. When the relay 119 is energized and picked up it closes its contacts 119a to energize the motor control raise means 55 for the purpose of raising the voltage of the slave tap changer transformer in the manner set forth in the above-mentioned patent. It should be noted that the rectifier 121 is so poled that it permits the flow of current from the terminal 114 to the terminal 115.

The translating means 117 also includes a relay of the electromagnetic or solenoid type having its operating winding connected through a rectifier 124 across the terminals 114 and 115. It will be noted that the rectifier 124 is so poled that it permits the flow of current through the operating winding from the terminal 115 to the terminal 114. When the relay 122 is energized and picked up it closes its make contacts 122a to energize the motor control lower means 56 for the purpose of lowering the voltage output of the slave tap changer transformer in the manner set forth in the aforesaid patent.

When an alternating voltage is applied across the terminals 114 and 115 half-wave pulses are supplied to the operating windings of the relays 119 and 122. Such pulses may result in chattering of the relays. To minimize such chattering of the relay 119 a rectifier 126 is connected across the winding. This rectifier is so poled that it presents an extremely low resistance to the flow of current produced by energy stored in the relay after the relay has been energized through the rectifier 121. Because of the low resistance path, the energy stored in the operating winding decays slowly between successive operating pulses and the relay remains picked up without chattering. In an analogous manner a rectifier 128 is connected across the winding of the relay 122. The rectifiers 126 and 128 may be referred to as commutating rectifiers.

The gate 112 is designed to be open to transmit current from the phase shifter 110 to the translating means 117 only for pulses of one polarity supplied by the winding 66. In a preferred embodiment of the invention, the gate 112 takes the form of a bridge rectifier having alternating current terminals 130 and 132. The bridge has direct current terminals 134 and 136 connected across the winding 66 preferably through a resistor R1. The purpose of this resistor will be discussed below.

By inspection of the rectifier 112 it will be noted that the rectifier includes two individual rectifiers 138 and 140 connected in series to transmit current from the terminal 134 to the terminal 136. In a similar manner the individual rectifiers 142 and 144 are connected in series to conduct current from the terminal 134 to the terminal 136. Thus current flowing in the direction of an arrow 146 and supplied by the winding 66 will flow freely through the rectifier 112 whereas current having the direction of the arrow 148 will be blocked by the rectifier.

Preferably a path for the current represented by the arrow 148 also is provided. This path may include a second rectifier similar to the rectifier 112 but polarized to transmit current flowing in the direction of the arrow 148. For present purposes it will be assumed that a single rectifier element 150 suffices and this rectifier element is connected across the winding 66 through a resistor R2 which is substantially equal in value to the resistor R1.

The resistor R1 has a value of resistance sufficient to restrict current transmitted therethrough from the voltage E to a value which is insufficient to pick up either of the relays 119 or 122. Consequently when the winding 66 has a zero output the rectifier 112 presents a high resistance to the flow of current from the phase shifter 110 to the translating means 117.

When the current 146 flows through the rectifier 112 the rectifier presents a negligible resistance to the flow of current from the phase shifter 110 to the translating means 117 up to a value equal to the value of the current represented by the arrow 146. However the maximum current which can be supplied under these circumstances to the translating means 117 is equal to the voltage E divided by the resistance of its associated circuit which includes the resistance of one of the windings 119 or 122. This prevents the application of excessive current to the translating means regardless of the magnitude of the current supplied by the winding 66. Consequently protective means for the translating means is not required and reliable performance of the relays 119 and 122 is assured.

The operation of the system now will be considered. Let it be assumed first that the master and slave tap changer transformers have the same voltage outputs. Under such circumstances the winding 66 has zero output and the rectifier 112 offers a substantial resistance to the flow of current from the phase shifter 110 to the translating means 117. Under these circumstances the relays 119 and 122 both remain dropped out.

Let it be assumed next that the master tap changer current transformer is operating with a voltage output higher than that of the slave tap changer transformer. Under such circumstances the winding 66 has a current output which may be represented by the current $I_A$ in FIG. 2. It will be assumed that each positive pulse or half cycle of the current $I_A$ produces a pulse of current in the direction of the arrow 146 which passes through the rectifier 112 and thus turns on the gate. For the duration of this pulse the pulse E can drive a substantial current through the low resistance of the rectifier 112 and through the translating means 117. Let it be assumed that during this pulse the voltage E drives a current in the direction of the arrow 152. This current passes through the rectifier 112, the rectifier 121 and the operating winding of the relay 119 to pick up the relay which closes the contacts 119a. Closure of the contacts 119a energizes the motor control raise means 55. This results in operation of the slave tap changing transformer for the purpose of moving its output voltage towards that of the master tap changing transformer. Succeeding pulses maintain the relay 119 picked up until a condition of substantial voltage equality is reached for the tap changing transformers at which time the output of the winding 66 becomes zero. The rectifier 112 now exhibits a high resistance to the current 152 and the relay 119 consequently drops out to terminate the energization of the motor control raise means 55.

Let it be assumed next that the voltage of the slave tap changing transformer exceeds that of the master tap changing transformer. Under such circumstances a current $I_B$ is supplied by the winding 66 to the rectifier 112 which is displaced in phase by 180° from the current $I_A$ as shown in FIG. 2.

By inspection of FIG. 2 it will be noted that the positive half cycles of the current $I_B$ which turn on the gate or rectifier 112 occuring during negative half cycles of the voltage E. Thus during the periods when the rectifier or gate 112 is open the negative half cycles of the voltage E direct a current in a direction represented by the arrow 154 which flows from the lower terminal of the phase shifter 110, through the operating winding of the relay 122, the rectifier 124, the gate 112, back to the upper terminal of the phase shifter. This current has sufficient magnitude to pick up the relay 122 and the relay energizes the motor control lower means 56 for the purpose of lowering the voltage output of the slave tap changing transformer substantially to a value corresponding to the output voltage of the master tap changing transformer. When this substantial equality occurs the output of the winding 66 becomes zero and the gate 112 turns off, the current passing through the operating winding of the relay 122 becomes insufficient to maintain the relay picked up and this relay consequently drops out to deenergize the motor control lower means 56. This terminates the adjustment of the slave tap changing transformer.

The maximum current which can be supplied to the operating winding of either of the relays 119 or 122 is determined by the magnitude of the voltage E and the resistance of the circuit containing the operating winding which is being energized. Thus the supply of an unusually large current by the winding 66 does not result in the application of an excessive current to the operating winding of either of the relays.

Although the invention has been described with reference to certain specific embodiments thereof numerous modifications falling within the spirit and scope of the invention are possible.

I claim as my invention:

1. In a phase-sensitive device having a first response to a pair of alternating quantities in phase and a second responsive to a pair of alternating quantities in phase opposition, a pair of first terminals, a first translating unit connected for a first response to voltage in only a first direction across said terminals, a second translating unit connected for a second response to voltage only in a second direction across said terminals, a source of alternating voltage, an electric-current-controlling gate having controlled terminals and control terminals, said gate permitting passage of substantial current between the controlled terminals only when voltage applied across said control terminals has a first polarity, and means coupling said first terminals for energization from the source through said controlled terminals, said gate comprising first and second rectifiers connected in series across the control terminals to transmit current therebetween in a first direction, third and fourth rectifiers connected in series across the control terminals to transmit current therebetween in the first direction, said controlled terminals comprising a terminal located between the first and second rectifiers and a terminal located between the third and fourth rectifiers.

2. In a phase-sensitive device having a first response to a pair of alternating quantities in phase and a second response to a pair of alternating quantities in phase opposition, a pair of first terminals, a first unidirectional translating unit connected for a first response to voltage in only a first direction across said terminals, a second unidirectional translating unit having a second response to voltage in only a second direction across said terminals, a source of alternating voltage, an electric-current-controlling gate having controlled terminals and control terminals, said gate permitting passage of substantial current between the controlled terminals only when voltage applied across said control terminals has a first polarity, and means coupling said first terminals for energization from the source through said controlled terminals, said gate comprising first and second rectifiers connected in series across the control terminals to transmit current therebetween in a first direction, third and fourth rectifiers connected in series across the control terminals to transmit current therebetween in the first direction, said controlled terminals comprising a terminal located between the first and second rectifiers and a terminal located between the third and fourth rectifiers, input terminals, an input circuit having substantial resistance coupling the input terminals to the control terminals for applying voltage of said first polarity across the control terminals to transmit current between the input terminals in a first direction through the control terminals, and a rectifier connected across the input terminals to transmit current therebetween in a second direction opposite to the first direction.

3. In a phase-sensitive device having a first response to a pair of alternating quantities in phase and a second response to a pair of alternating quantities in phase opposition, a pair of first terminals, first and second rectifiers, a first current-responsive translating unit connected through the first rectifier across said terminals to transmit current therebetween only in a first direction, a second current-responsive translating unit connected through the second rectifier to transmit current therebetween only in a second direction, an alternating-current rectifier bridge having alternating-current terminals connected in series with the first terminals, first and second input terminals, said rectifier bridge having direct current terminals connected to the input terminals through a circuit having substantial resistance, and a rectifier connected across said input terminals to pass current therebetween in a direction opposite to the direction of current passing therebetween through the rectifier bridge.

4. In a phase-sensitive device having a first response to a pair of alternating quantities in phase and a second response to a pair of alternating quantities in phase opposition, a pair of first terminals, first and second rectifiers, a first current-responsive translating unit connected through the first rectifier across said terminals to transmit current therebetween only in a first direction, a second current-responsive translating unit connected through the second rectifier to transmit current therebetween only in a second direction, an alternating-current rectifier bridge having alternating-current terminals connected in series with the first terminals, first and second input terminals, said rectifier bridge having direct current terminals connected to the input terminals through a circuit having substantial resistance, and a rectifier connected across said input terminals to pass current therebetween in a direction opposite to the direction of current passing therebetween through the rectifier bridge, each of said translating units comprising an electromagnetic relay having an operating winding, and a separate rectifier connected across each of the operating windings poled to provide a low-resistance path for energy stored in the associated winding through the first and second rectifiers respectively.

5. In a phase-sensitive device having a first response to a pair of alternating quantities in phase and a second response to a pair of alternating quantities in phase opposition, a pair of first terminals, first and second rectifiers, a first current-responsive translating unit connected through the first rectifier across said terminals to transmit current therebetween only in a first direction, a second current-responsive translating unit connected through the second rectifier to transmit current therebetween only in a second direction, a phase-shifter device having input terminals and output terminals, an alternating-current rectifier bridge having alternating-current terminals connected in series with the first terminals across the output terminals of the phase-shifter device, first and second input terminals, said rectifier bridge having direct current terminals connected to the input terminals through a circuit having substantial resistance, and a rectifier connected across said input terminals to pass current therebetween in a direction opposite to the direction of current passing therebetween through the rectifier bridge.

References Cited in the file of this patent

UNITED STATES PATENTS

| | | |
|---|---|---|
| 2,935,660 | Patchell | May, 3, 1960 |
| 2,945,950 | Midkiff | July 19, 1960 |